United States Patent [19]

Tse et al.

[11] Patent Number: 4,473,657

[45] Date of Patent: Sep. 25, 1984

[54] ZEOLITE RESTORATION

[75] Inventors: Harold F. Tse, Kearny; Harold N. Rabinowitz, Upper Montclair, both of N.J.

[73] Assignee: Engelhard Corporation, Iselin, N.J.

[21] Appl. No.: 409,743

[22] Filed: Sep. 18, 1982

[51] Int. Cl.$^3$ .................. B01J 23/96; B01J 37/14; B01J 37/20; B01J 37/24

[52] U.S. Cl. ........................ 502/37; 502/35; 502/38; 502/50

[58] Field of Search .......... 252/414, 415, 416, 411 R; 502/34, 35, 37, 38, 50

[56] References Cited

U.S. PATENT DOCUMENTS 4,192,771 3/1980 Burbidge et al. ............... 252/411 R
4,198,287 4/1980 Hemler, Jr. et al. ............ 282/416

Primary Examiner—Delbert E. Gantz
Assistant Examiner—Anthony McFarlane

[57] ABSTRACT

Molecular sieve catalysts, such as alumino-silicate zeolites, used in hydrocarbon conversion and separation processes, are restored after their recommended use-cycle service, by novel methods of regeneration and metal redispersion, or rejuvenation.

An additive compound is injected into the catalyst during regeneration, or coke removal. The additive is of a molecular diameter large enough to prevent the additive from being captured by a cell of the catalyst, and is preferably of a pH which promotes adsorption of the additive onto the zeolite material.

Metal-coated zeolite catalysts are rejuvenated, preferably after regeneration, by injecting a halogen compound followed by the above additive compound, and then heating the catalyst to a high temperature. This procedure is effective in re-dispersing metal agglomerates uniformly throughout the catalyst to restore the original metal coating.

25 Claims, No Drawings

ZEOLITE RESTORATION

BACKGROUND OF THE INVENTION

This invention relates to zeolitic materials used in elevated-temperature hydrocarbon separation and conversion processes, and relates particularly to zeolite molecular sieves. More particularly, it relates to methods for restoring such catalysts to their original activity and selectivity by removal of operating residues and impurities, and to methods of re-dispersion of metal particles for those catalysts having an outer layer of adsorbing metal.

Molecular sieves have been widely used to separate classes of organic compounds and compounds within a class. Molecular sieves are typically crystalline aluminosilicate materials belonging to the zeolite class. These materials are able to be dehydrated with very little change in their crystal structure. The dehydrated crystals possess a network of uniform cells comprising about half the total volume of crystals. The cells have a strong tendency to recapture the water molecules or any material small enough to get into the cells. This promotes a screening action making it possible to separate smaller molecules from larger ones.

When used on-stream, a hydrocarbon feedstock is passed through the catalyst at elevated temperature to accomplish the desired process of selectivity. Well-known, for example, are methods which separate n-paraffins and n-olefins from their branched counterparts; separation of aromatic from cyclic isomers; and separation of n-hydrocarbons from their positional isomers.

Molecular sieve catalysts are also widely used in hydrocarbon conversion procedures, in which, for example, selected feedstock fractions are converted into positional isomers and/or branched (skeletal) isomers of the fractions.

Also well-known, if not appreciated, is the steady buildup of impurities on the catalyst from these processes, most prominently coke, resulting from the polymerization of highly-unsaturated components of the feedstock, such as butadiene. Depending upon the specific catalyst selected and the nature of the hydrocarbon process, the point eventually comes where too much residue has accumulated for the catalyst to effectively operate. The catalyst is then subjected to a regeneration process to reduce or eliminate the coating of impurities. Total elimination is unknown, and in fact, the regeneration methods heretofor practiced produce unwanted side effects and impurities within the catalysts themselves.

For example, mordenite catalysts which are known to be used in commercial $C_8$ - aromatic separation and isomerization processes, are usually regenerated by a high-temperature proof-burn. This is a staged burn and consists, for example, in a 700 F. degree burn with enough oxygen to raise the temperature in the catalyst about 150 F. degrees. Then the average catalyst temperature is increased by about 100 to 200 F. degrees. The disadvantages of this method include filling of the cells with impurities and moisture formed by the burning itself, and permanent damage of the zeolite structure, referred to as structural shift. The practical result of this method is a regenerated catalyst with substantially decreased activity and selectivity. This is the accepted state of affairs, however, it means that the catalyst will have to be retired after a given number of regenerations.

This type of regeneration would be more effective if carried out under dry conditions; however, in the real world, it is too costly to exclude moisture from the procedure.

Most catalysts used in hydrocarbon selection methods are provided with an outer, very thin coating of a gas-adsorbing metal, typically a Group VIII metal, such as platinum or palladium. After considerable service, and particularly after coke burn during regeneration, the metal particles usually agglomerate into large crystallites. For such catalysts, a redispersion of the agglomerates is necessary to fully restore the selectivity. Two of the most common methods to achieve this rejuvenation are hot air-soaking and metal/halide complexing.

In the former process, the preferably already-regenerated catalyst is simply injected with an oxygen-in-nitrogen vapor at high temperature, for example, 900–1000 degrees F. for 2–10 hours to redisperse the metal. In the latter process, an organic halide is introduced under similar conditions. The object with all rejuvenations involving redispersants is to form metal/redispersant complexes which are then free to migrate to the sites in the catalyst structure which are in a relatively depleted condition. The main drawback of the processes is the tendency for the complexed metal to breach the zeolite cell structure and enter the internal cells. The obvious result is, of course, loss of adsorption sites and thus lower activity and selectivity of the catalyst.

The desirability of having an improved method or methods of restoring zeolite catalysts is recognized as a continuing one, and it is the principal object of the inventions disclosed herein to provide a method for regenerating a fouled catalyst, and thereafter rejuvenating a metal-containing catalyst.

SUMMARY OF THE INVENTION

This invention provides a method for regenerating a coked zeolite catalyst by adding to the catalyst prior to coke burn an organic compound having a molecular diameter great enough for the compound to be physically excluded from the cell structure of the zeolitic portion of the catalyst. The additive has a pH generally opposed to that of the catalyst so as to be adsorbed onto the zeolite cell structure. The additive is preferably ignitable at a temperature close to the ignition point of the coke.

This invention also provides a method for rejuvenating a metal-containing catalyst which includes injecting an inorganic or organic halogen compound having complexing affinity for the agglomerated metal in the catalyst, injecting a regeneration additive as described above, and then heating at a high temperature for a time sufficient to redisperse the agglomerated metal throughout the catalyst. The presence of the regeneration additive during rejuvenation will greatly reduce the possibility of unwanted metal/halide decomposition products from entering the zeolite cell structure to poison or change the structure.

DESCRIPTION OF THE INVENTION

The catalyst restoration method of this invention is useful for any natural or synthetic zeolitic catalysts used in hydrocarbon process technology, and has found particular utility when used to restore natural or synthetic mordenite catalysts.

The uses and chemical makeup of these sodium or calcium hyrated alumino-silicate materials are well known to the art. For example, U.S. Pat. Nos. 3,919,340 and 3,642,925 describe Group VIII metal-containing isomerization catalysts based on mordenite or faujasite zeolites, having in this case, preferred cell diameters of 20 to 300 Å. These materials may be synthetically prepared. U.S. Pat. No. 4,014,949 describes methods of separating cyclic compounds using zeolite molecular sieves having pore diameters of 6 Å or greater. The separation of meta-xylene from para-xylene by, e.g. sodium Y zeolites is disclosed.

REGENERATION

According to the method of this invention, a used or coked zeolite catalyst is regenerated by burning the coke and an organic additive in-situ, such that the catalyst suffers minimum damage and reduced effectiveness from capture of the moisture and poisonous by-products of the burn. The molecular diameter of the additive should be at least as large as the cell diameter of the zeolitic portion of the catalyst to be regenerated, and preferably larger.

It is very important that the additive have a strong tendency to be adsorbed into the pores of the catalyst to protect the cells from retaining unwanted burn by-products. If the additive is of a pH generally opposed to that of the zeolite, the additive will be adsorbed thereon. Thus, for example, if the catalyst is acidic, such as hydrogen mordenite, then a mildly acidic to basic additive is to be used.

It is not desirable for the additive to remain on the catalyst after regeneration, as its presence will reduce the activity of the zeolite. Therefore, it is preferred that the additive have an ignition temperature of within about 200°–300° F. of that of the coke being removed. Obviously, the ignition temperature should not be much lower, or it would combust well ahead of the coke and loose much of its effectiveness.

The tendency of the additive to prevent combustion moisture from entering the zeolite cell structure has been found to be enhanced if the additive itself is hydrophobic. While not critical, this property is desirable when the above criticalities of pH and molecular diameter have been met.

It is clear that the primary determinants in selecting the additive will be the nature of the zeolite and its average cell diameter. These factors, and the amount of coke buildup, will also largely dictate the amount of additive to be injected into the catalyst. The preferred amount is simply that which is most effective in regenerating a specific catalyst, and must be determined on an experimental basis.

When added to the catalyst, the additive should be relatively uniformly dispersable throughout. It is therefore critical that when the additive is to be injected with a solvent therefore, the solvent is non-harmful to the zeolite itself and that it will be expelled from the catalyst at a temperature well-below that of the coke.

The inventive regeneration method comprises injecting an effective amount of the additive in a coked zeolite catalyst, and heating the catalyst to at least the ignition temperature of the coke for a time sufficient to burn the coke from the zeolite. Generally, heating of the catalyst is two-staged: The bed is heated externally to about 800° F.; thereafter, oxygen is injected to bring the bed up to the coke ignition temperature. When the temperature of the bed returns to the original externally heated level, most, if not all, of the coke has been burned.

The methods of this invention will be described with respect to mordenite isomerization catalysts which have an average pore diameter of about 8 Å and are strongly acidic. It has been found that organo-sulfur compounds of appropriate molecular diameter work best since they are basic. For example, excellent results have been obtained with octanethiol. Another, although somewhat less effective, additive is chlorothiophene. Other organo-sulfur compounds which may serve as the additive include the mercaptans $CH_3(CH_2)_nSH$, where n=4 to 10; dibenzysulfide; dimethyl-dithiodipropionate; and dimercaptodiethyl ether.

REJUVENATION

While the regeneration procedure of this invention provides excellent restoration of selectivity and activity, a catalyst having an adsorbing metal layer may, after much use, or several regenerations, experience undesirable metal redispersion. Palladium or platinum, e.g. will tend to redeposit in aggolomerates throughout the catalyst. Thus, the prior art has developed the before-mentioned hot air-soaking and metal/chloride complexing procedures for redispersing the agglomerates.

Generally, when the novel regeneration method of this invention is used for a metal-containing catalyst, best restoration of the catalyst is obtained when rejuvenation is additionally employed. However, even more improved results occur when the novel rejuvenation method of this invention is practiced.

The method comprises injecting a halide compound capable of complexing with the catalyst metal, followed by injection of an additive as specified in regeneration above. Generally, the additive will be the same as was used in regenerating the catalyst, but need not be, so long as it fulfills the same requirements of molecular size and affinity for the zeolite as before described. The advantages of injecting the additive are the same as in regeneration; namely, protecting the zeolite cell structure from contamination during the high-heat phase of rejuvenation. Additionally, it permits the use of more readily-decomposable organic halides than the normal-lyused chlorides. This results in an even further reduced tendency of the catalyst being contaminated by retention of active chloride ions. A preferred halide, in restoration of the acid mordenite zeolites, is a bromide, such as bromo-ethane, in combination with octanethiol. Other useful bromides are $C_nH_{2n+1}Br$, $C_nH_{2n}Br_2$, and $C_nH_{2n-1}Br_3$, where n is 1 to 10; $C_xH_{x-1}Br$ and $C_xH_{x-2}Br_2$, where x is 6 or less.

The amounts of halide and additive to be injected are again those which experimentation show as being most effective for a specific zeolite having a specific adsorbing metal. Generally, the amount of additive will be the same as used in regenerating the catalyst.

Rejuvenation comprises injection of the halide into the regenerated zeolite at a temperature much below that of regeneration, followed by injection of the regeneration additive; humid air is introduced and the temperature is raised to a level at or about that of regeneration for a time sufficient to accomplish metal redispersion.

EXAMPLES

The novel restoration methods of this invention are illustrated with respect to mordenite isomerization catalysts, as supplied by Englehard Industries and The Norton Company. These catalysts generally have average zeolite cell diameters of about 8 Å and were used in hydrocarbon processing methods for periods of 3 months to 3 years before undergoing regeneration and rejuvenation. All catalysts contain a layer of platinum. After restoration, the catalysts were used in an isomerization method which employs a model laboratory feedstock of 30% ethyl benzene (EB) and 70% meta-xylene (MX). The activity of the zeolite is checked with respect to both ethyl benzene and paraxylene (PX) conversions and selectivity is measured by aromatic loss. These values are then compared to those of new, or fresh, zeolite catalysts.

With the catalysts used herein, the desired isomerization method converts meta-xylene to para-xylene, and regarding ethyl-benzene, converts it to other aromatic compounds or permits it to pass unchanged. Thus, EB activity is desirably high, PX activity high, and aromatic loss in general kept to a minimum.

As the mordenite catalysts are used, and coke buildup proceeds, the effect on the model feedstock would be to decrease EB and PX activity, and increase aromatic loss. The aim of the restoration methods of this invention, then, is to reverse those trends and restore zeolite activity as close as possible to that of a fresh catalyst.

EXAMPLE I

Eleven coked catalysts comprised of hydrogen mordenite from The Norton Co. were subjected to proof-burn regeneration by raising the zeolite bed temperature to about 700° to 800° F. and then producing a second rise in temperature of about 150° to 200° F. by injecting a 5% oxygen-in-nitrogen stream. Oxygen flow was maintained until the bed temperature fell to its original value, completing the regeneration procedure. The catalysts were then used to process a 30% EB/70% MX feedstock as described above, and averages for the group were taken and compared to a fresh, never-used similar catalyst. The results are tabulated below in Table I in percentages of increase or decrease over the fresh catalyst.

EXAMPLE II

Three coked catalysts similar to those of Example I were regenerated according to the present invention as follows. A mixture of 50% isopropanol and 50% octanethiol, by volume, was injected into the catalyst, held at 800° F., under 200 psig hydrogen atmosphere, a 6 SCFH hydrogen flow rate, for 2 hours. The estimated deposition of additive on the catalyst was 0.45 wt. % octanethiol per weight of catalyst.

The system was then de-pressurized, purged with nitrogen, and re-pressurized with nitrogen to 200 psig. 2.2% oxygen-in-nitrogen was introduced into the system at a flow rate of 85 pounds of gas per square foot of catalyst per hour, resulting in a 150° F. rise in temperature in the catalyst bed. This temperature was held for about 12 hours and then oxygen flow was stopped. The catalysts were cooled to between 750° to 800° F., activated, and tested with the feedstock described above. Averages for the three were computed and compared to the same fresh catalyst as in Example 1. See Table I for the results. As can be seen by comparing the results of the foregoing two examples, catalysts regenerated by the novel method of this invention have significantly more desirable EB and PX activity, and also a reduced aromatic loss.

EXAMPLE III

A series of 12 coked zeolite catalysts similar to those tested in Examples I and II were regenerated using the novel method of Example II, and were subsequently rejuvenated using a small-scale, or laboratory, method of hot dry air-soaking as a control. It is expected that the use of dry air should give the optimum results of all the prior art methods known, because of the absence of moisture which could be retained by the zeolite cells. The method is not commercially practical because of the high cost of dehydrating the commercial unit, but is useful for comparative purposes.

Basically the lab method comprises cooling the regenerated catalyst by nitrogen to about 500° F., injecting dry air into the system while raising the temperature to about 800° to 975° F., holding that temperature for about 1 to 3 hours, and cooling to 750° to 800° F., activating and evaluating.

Averages for the dozen restored zeolite catalysts were computed as before using the same test feed, and compared to the same fresh catalyst of Examples I and II. From Table I it is clear that dry air rejuvenation, after the regeneration method of this invention, yields well-restored catalysts.

EXAMPLE IV

A coked catalyst similar to those tested above was regenerated by the inventive method of Example II, and then rejuvenated by the method of this invention, as follows.

The regenerated catalyst was purged with nitrogen to lower the temperature to 500° F. and the system was depressurized to atmospheric pressure. Bromo-ethane was injected into the catalyst for 2 hours to provide 1.25 gram of bromoethane per 100 grams of the catalyst. Octanethiol was then added to the catalyst at the same rate and amount as in Example II. To simulate commercial operation 60 psig of wet air was then injected, after which the bed temperature was then increased to about 900° F. and held for 1 hour. The temperature was dropped to 800° F., and the zeolite catalyst purged with nitrogen to complete the procedure.

When the thus-restored catalyst was activated and tested with the 30% EB/70% MX isomerization feed and compared to the same fresh catalyst of the previous examples, aromatic loss was only 4.8% higher, EB activity increased 45%, and PX activity was up 32.3%. (See Table I).

It is clear from the foregoing Examples III and IV, that the regeneration method of this invention, when followed by the novel rejuvenation method of same, not only restores a treated zeolitic catalyst's aromatic selectivity, but actually may improve certain isomerization activity functions of the catalyst. From Table I it is clear that the results steadily improve from Example I thru IV.

TABLE I

| | COMPARED TO FRESH CATALYST | | | |
|---|---|---|---|---|
| | Ex. I (Regen. burn only) | Ex. II (Regen. with octane-thiol) | Ex. III (Regen. oct-thiol and air-soak rejuv.) | Ex. IV (Regen. oct-thiol and Bromo-ethane rejuv.) |
| EB ACTIVITY | −9.6% | +2.8% | +8.5% | +45.0% |
| PX ACTIVITY | −2.6% | +16.7% | +15.6% | +32.3% |

TABLE I-continued

| | COMPARED TO FRESH CATALYST | | | |
|---|---|---|---|---|
| | Ex. I (Regen. burn only) | Ex. II (Regen. with octane-thiol) | Ex. III (Regen. oct-thiol and air-soak rejuv.) | Ex. IV (Regen. oct-thiol and Bromo-ethane rejuv.) |
| AROMATIC LOSS | +22.6% | +17.8% | +16.7% | +4.8% |

EXAMPLE V

Three coked Engelhard Industries mordenite catalysts were regenerated and rejuvenated and then tested with the feed of the foregoing examples.

Catalyst #1 was regenerated with a standard proof-burn without additive, and metal redispersion was accomplished with a 5% oxygen-in-nitrogen soak at 300 psig for 4 hours.

Catalyst #2 was regenerated with the method of Example II and this invention, and rejuvenated same as Catalyst #1.

Catalyst #3 was regenerated and rejuvenated with the inventive procedures of Examples II and IV.

The catalysts were tested with the feedstock of the foregoing examples, compared to an average of two fresh similar catalysts and the results are shown in Table II. As in Table I the percentages of increase or decrease over the control are shown.

TABLE II

| | COMPARED TO FRESH CATALYST | | |
|---|---|---|---|
| | Catalyst #1 | Catalyst #2 | Catalyst #3 |
| EB ACTIVITY | −27.7% | −20.3% | +8.2% |
| PX ACTIVITY | −26.6% | −10.8% | +8.4% |
| AROMATIC LOSS | +2.7% | +1.4% | −2.7% |

EXAMPLE VI

A series of mordenite catalysts similar to those tested in the preceding Examples are regenerated and rejuvenated in the comparative fashion of Example V, and are then tested with the feed used in the foregoing Examples.

However, instead of using the octanethiol regeneration additive and the bromoethane rejuvenation additive which yielded the results of the foregoing Examples, the following additives are individually used in this series of regeneration steps: chlorothiophene; the mercaptans $CH_3(CH_2)_nSH$, where n is 4, 7 and 10; dibenzysulfide; dimethyldithiodipropionate; and dimercaptodiethyl ether.

The following additives are used individually in this series of rejuvenation steps in various combinations with the just-listed regeneration additives: bromides having the formula $C_nH_{2n+1}Br$, $C_nH_{2n}Br_2$, and $C_nH_{2n-1}Br_3$, wherein n is 1, 5 and 10; $C_xH_{x-1}Br$ and $C_xH_{x-2}Br_2$, wherein x is 6.

In all cases catalysts which are regenerated with the method of Example II and the just-listed additives, and catalysts which are regenerated and rejuvenated with the inventive procedures of Examples II and IV and the additives of this Example, show improved EB and PX activities and reduced or improved aromatic loss when compared with catalysts which are regenerated with a standard proof-burn without additive and regenerated by a 5% oxygen-in-nitrogen soak as per Catalyst #1 of Example V.

It can be seen that increasing improvement in catalyst restoration occurs as one moves from prior art regeneration to that of the present invention, and to the latter plus the rejuvenation method of this invention for adsorbing metal-coated zeolite catalysts. While best results are achieved for the latter when regeneration is combined with metal re-dispersion, it is obvious that the inventive regeneration method is useful in itself, or with prior art rejuvenation procedures, and vice versa for the inventive rejuvenation method described herein. These and other combinations are deemed to be within the scope of this invention.

What is claimed is:

1. In a method for regeneration of a coked zeolite-containing porous catalyst wherein the zeolite-containing catalyst bed temperature is elevated and coke thereupon is burned in the presence of oxygen forming reaction products which if allowed to enter the cell structure of the zeolite are harmful to the cell structure, the improvement comprising:

(a) injecting an ignitible organic regeneration additive into the catalyst, the ignitible organic regeneration additive being absorbed into the catalyst pore structure and adsorbed onto the zeolite cell structure but having a molecular diameter at least as large as the average cell diameter of the zeolite thereby preventing the ignitible organic regeneration additive from being captured by cells in the zeolite while protecting the cells from reaction products formed during the burn; and (b) removing the ignitible organic regeneration additive by allowing it to burn while the zeolite containing catalyst bed is at elevated temperature.

2. The method of claim 1 wherein the additive is adsorbed onto the zeolite primarily because of the relative pH differences between the additive and the zeolite material.

3. The method of claim 2 wherein the zeolite material is of the acidic mordenite type.

4. The method of claim 3 wherein the additive comprises a basic organo-sulfur compound.

5. The method of claim 1 wherein the catalyst contains a layer of an adsorbing metal, and wherein the method further comprises sequentially heating the regenerated catalyst in the presence of a gas or vapor in order to redisperse agglomerated metal throughout the catalyst.

6. The method of claim 5 wherein the gas or vapor comprises oxygen.

7. The method of claim 5 wherein the gas or vapor comprises a halide.

8. The method of claim 4 wherein said organo-sulfur compound is octanethiol.

9. The method of claim 5 wherein the catalyst contains a layer of an adsorbing metal, and wherein the method further comprises sequentially heating the regenerated catalyst in the presence of a gas or vapor to redisperse agglomerated metal throughout the catalyst.

10. The method of claim 9 wherein the gas or vapor comprises oxygen.

11. The method of claim 9 wherein the gas or vapor comprises a halide.

12. A method of rejuvenating a porous catalyst comprised of a zeolite material and containing a layer of an adsorbing metal to redisperse metal agglomerated during use throughout the catalyst, which comprises sequentially injecting into the catalyst:

a. a halide capable of complexing with the metal under high heat conditions; and b. an additive which is capable of being absorbed into pore structure of the catalyst and adsorbed onto the cell structure of the zeolite, and which is of a molecular diameter at least as large as the average cell diameter of the zeolite; and heating the thus-treated catalyst to a temperature which is high enough to effect complexing of the halide and agglomerated metal and consequent redispersion of the metal throughout the catalyst.

13. The method of claim 12 wherein the additive is adsorbed onto the zeolite primarily because of the relative pH differences between the additive and the catalyst material.

14. The method of claim 13 wherein the zeolite material is of the acidic mordenite type.

15. The method of claim 14 wherein the additive comprises a basic organo-sulfur compound.

16. The method of claim 15 wherein said organo-sulfur compound is octanethiol.

17. The method of claim 12 wherein said adsorbing metal is a metal from Group VIII of the Periodic Table.

18. A method of restoring the activity and selectivity of a zeolite-containing porous catalyst having a layer of an adsorbing metal therein, which comprises:

a. injecting an additive into the catalyst which is capable of being adsorbed into the catalyst pore structure and adsorbed onto the zeolite cell structure, and which has a molecular diameter at least as large as the average cell diameter of the zeolite, and thereafter raising the temperature of the catalyst high enough to burn substantially all of the coke and the additive out of the catalyst;

b. cooling the catalyst;

c. sequentially injecting into the catalyst:
   (i) a halide capable of complexing with the metal under high heat conditions; and
   (ii) an additive which is capable of being absorbed into the catalyst pore structure and adsorbed onto the cell structure of the zeolite, and which is of a molecular diameter at least as large as the average cell diameter of the zeolite;

d. heating the thus-treated catalyst to a temperature which is high enough to effect complexing of the halide and agglomerated metal and consequent redispersion of the metal throughout the catalyst.

19. The method of claim 18 wherein the additive is adsorbed onto the zeolite primarily because of the relative pH differences between the additive and the catalyst material.

20. The method of claim 19 wherein the zeolite material is of the acidic mordenite type.

21. The method of claim 20 wherein the additive comprises a basic organo-sulfur compound.

22. The method of claim 21 wherein said organo-sulfur compound is octanethiol.

23. The method of claim 22 wherein the halide is a organo-bromide.

24. The method of claim 23 wherein said adsorbing metal is a metal from Group VIII of the Periodic Table.

25. The method of claim 24 wherein said halide is bromoethane.

* * * * *